US008689328B2

(12) United States Patent
Ormazabal et al.

(10) Patent No.: US 8,689,328 B2
(45) Date of Patent: Apr. 1, 2014

(54) MALICIOUIS USER AGENT DETECTION AND DENIAL OF SERVICE (DOS) DETECTION AND PREVENTION USING FINGERPRINTING

(75) Inventors: Gaston S. Ormazabal, New York, NY (US); Henning G. Schulzrinne, Leonia, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 323 days.

(21) Appl. No.: 13/025,421

(22) Filed: Feb. 11, 2011

(65) Prior Publication Data
US 2012/0210421 A1 Aug. 16, 2012

(51) Int. Cl.
G06F 21/00 (2013.01)

(52) U.S. Cl.
USPC .......................................................... 726/22

(58) Field of Classification Search
None
See application file for complete search history.

(56) References Cited

U.S. PATENT DOCUMENTS

| 8,141,152 | B1* | 3/2012 | Hwang et al. .................. 726/22 |
| 2002/0032871 | A1* | 3/2002 | Malan et al. .................. 713/201 |
| 2006/0036727 | A1* | 2/2006 | Kurapati et al. .............. 709/224 |
| 2007/0121596 | A1* | 5/2007 | Kurapati et al. .............. 370/356 |
| 2007/0177607 | A1* | 8/2007 | Niccolini et al. ........... 370/395.5 |
| 2008/0031258 | A1* | 2/2008 | Acharya et al. .......... 370/395.42 |
| 2008/0084975 | A1* | 4/2008 | Schwartz .................... 379/88.22 |
| 2009/0043724 | A1* | 2/2009 | Chesla ............................ 706/52 |
| 2009/0103524 | A1* | 4/2009 | Mantripragada et al. ...... 370/352 |
| 2009/0180391 | A1* | 7/2009 | Petersen et al. ............... 370/252 |
| 2010/0064362 | A1* | 3/2010 | Materna et al. .................. 726/15 |
| 2010/0107230 | A1* | 4/2010 | Tyagi et al. ........................ 726/6 |
| 2010/0142382 | A1* | 6/2010 | Jungck et al. ................. 370/242 |
| 2010/0154057 | A1* | 6/2010 | Ko et al. .......................... 726/23 |
| 2011/0138462 | A1* | 6/2011 | Kim et al. ....................... 726/22 |
| 2011/0246640 | A1* | 10/2011 | Saha et al. .................... 709/224 |
| 2012/0151585 | A1* | 6/2012 | Lamastra et al. ............... 726/24 |
| 2012/0167208 | A1* | 6/2012 | Buford et al. ................... 726/22 |
| 2012/0250586 | A1* | 10/2012 | Ahmavaara et al. .......... 370/259 |

OTHER PUBLICATIONS

Humberto J. Abdelnur, et al., "Advanced Network Fingerprinting," Centre de Recherche INRIA Nancy—Grand Est, Villers-les-Nancy, France, Recent Advances in Intrusion Detection (RAID). 2008, 18 pages.

Gaston Ormazabal, et al., "Secure SIP: A Scalable Prevention Mechanism for DoS Attacks on SIP Based VoIP Systems," Verizon Laboratories, Department of Computer Science, Columbia University, Springer-Verlad, Berlin Heidelberg. IPTComm 2008, 26 pages.

* cited by examiner

*Primary Examiner* — Andrew L Nalven
*Assistant Examiner* — Christopher Ruprecht

(57) ABSTRACT

A method may include receiving a session control protocol request message and fingerprinting the received session control protocol message. The method may further include comparing the fingerprint of the received request message to a list of fingerprints associated with known malicious user agents and rejecting the request message when the fingerprint of the received message matches any fingerprint in the list of fingerprints associated with known malicious user agents. The method may include comparing the fingerprint of the received request message to the list of fingerprints associated with known non-malicious user agents and accepting the request message when the fingerprint of the received message matches any fingerprint in the list of fingerprints associated with known non-malicious user agents.

23 Claims, 12 Drawing Sheets

```
INVITE sip:bob@biloxi.com SIP/2.0
Via: SIP/2.0/UDP pc33.atlanta.com;branch=z9hG4bK776asdhds
Max-Forwards: 70
To: Bob <sip:bob@biloxi.com>
From: Alice <sip:alice@atlanta.com>;tag=1928301774
Call-ID: a84b4c76e66710@pc33.atlanta.com
CSeq: 314159 INVITE
Contact: <sip:alice@pc33.atlanta.com>
Content-Type: application/sdp
Content-Length: 142
```
⎱ HEADER 310

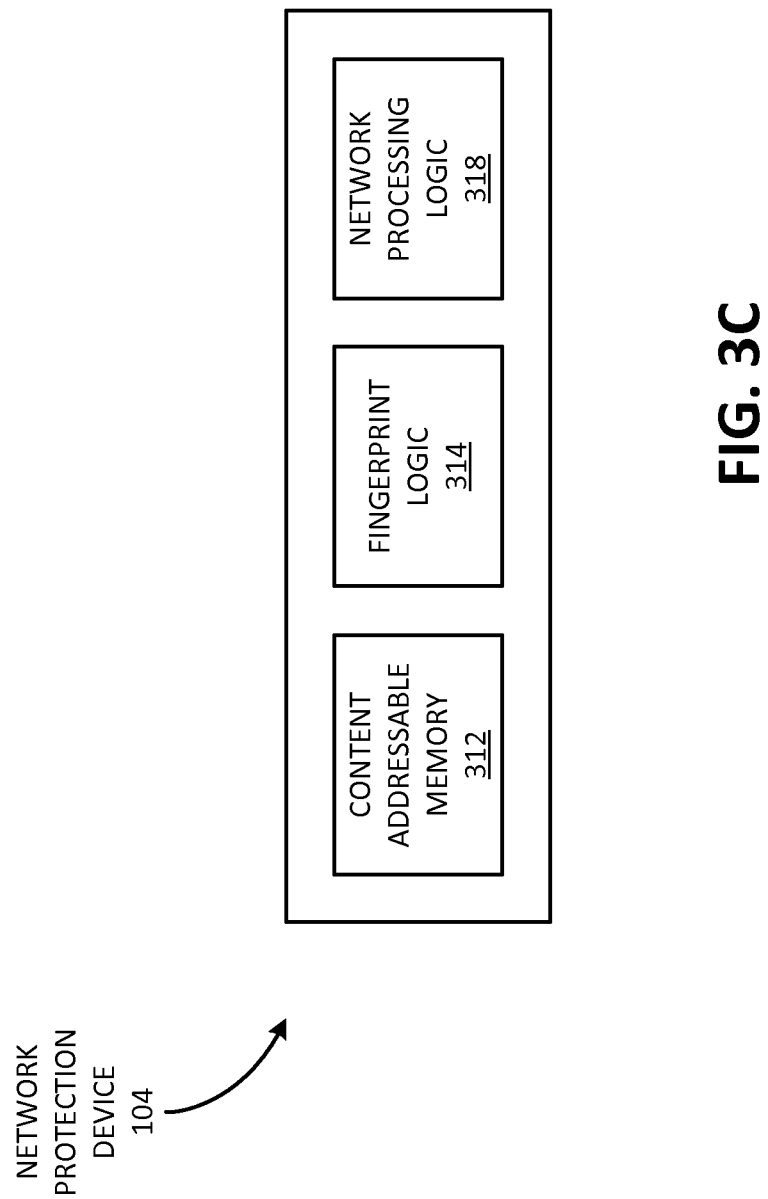

| WHITELIST 422 | |
|---|---|
| FINGERPRINT 424 | FLAG 426 |
| 9YB4SL0JY4 | Y |
| LKB64DS9U6 | Y |
| FK987VFR3S | Y |
| 9UJN653GI0 | Y |
| ... | ... |

FIG. 4B

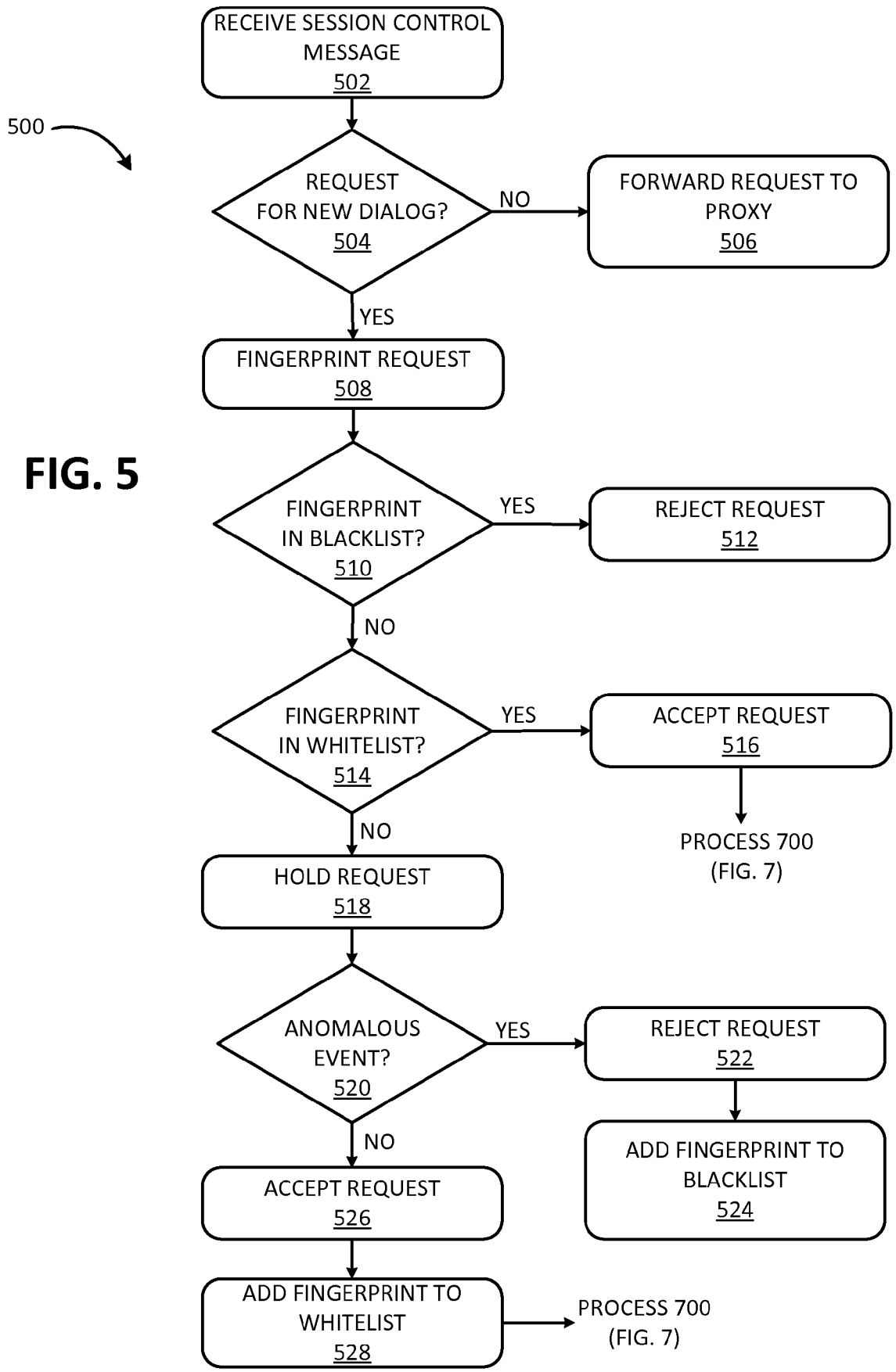

US 8,689,328 B2

MALICIOUIS USER AGENT DETECTION AND DENIAL OF SERVICE (DOS) DETECTION AND PREVENTION USING FINGERPRINTING

BACKGROUND INFORMATION

It is not uncommon for malicious devices in a communication network to attempt to compromise the network, thereby preventing legitimate devices from enjoying the services of the network. Such an attack is called a "denial-of-service" (DoS) attack. When multiple devices, e.g., a botnet, simultaneously launch a DoS attack, it is known as a Distributed DoS (DDos) attack.

Malicious devices may attack a communication network that employs a "session signaling" or "session control" protocol. Such a protocol may create, modify, and terminate sessions (e.g., telephone calls, instant messaging conferences) among participants of the session. Session Initiation Protocol (SIP) is one such session signaling protocol, e.g., an application-layer protocol for creating, modifying, and terminating sessions.

BRIEF DESCRIPTION OF THE DRAWINGS

FIG. 3C is a block diagram of exemplary components of the network protection device of FIG. 1B;

FIG. 4B is a diagram of an exemplary whitelist;

FIG. 5 is a flowchart of an exemplary process for detecting malicious user agents, detecting a DoS attack, and/or preventing a DoS attack;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention, as claimed.

As discussed above, a communication network may employ a session control protocol to establish and terminate sessions between devices. In doing so, the network may employ a proxy to handle session signaling on behalf of a user device. The proxy may handle session signaling for many (e.g., thousands or millions) of devices. Therefore, overwhelming a proxy may deny service to thousands or millions of customers. Many network providers are migrating to communication networks that employ session control protocols (e.g., Session Initiation Protocol (SIP)) and proxies. These networks include: (1) an all Internet Protocol (IP) network using SIP proxies; (2) an IP Multimedia Subsystem (IMS) network using SIP proxies; and (3) a Long Term Evolution (LTE) network with Voice over LTE using SIP proxies. These and other networks are vulnerable to DoS and DDoS attacks.

Embodiments disclosed herein may detect malicious packets and/or sources in a network. Embodiments may extract unique features from packets (e.g., "fingerprints" of information in the packets), which may allow the identification and/or classification of malicious packets and sources. These embodiments may implement hardware-based deep-packet inspection technology (e.g., inspection at the application or seventh layer of the Open System Interconnection (OSI) model stack). These embodiments may further help thwart botnet flooding attacks through fingerprinting. Such fingerprinting may distinguish a SIP header as being from a malicious source or a non-malicious source. For example, embodiments disclosed below may use information in just one session control protocol message (e.g., information in one or more fields of a header, the ordering of the header fields, etc.) to fingerprint the message. In this embodiment, an attack source may be identified by the fingerprint without identifying its source (e.g., via a network address). Thus, embodiments disclosed below may allow for the detection and prevention of DDoS attacks on the SIP signaling channel.

Figure 1A:
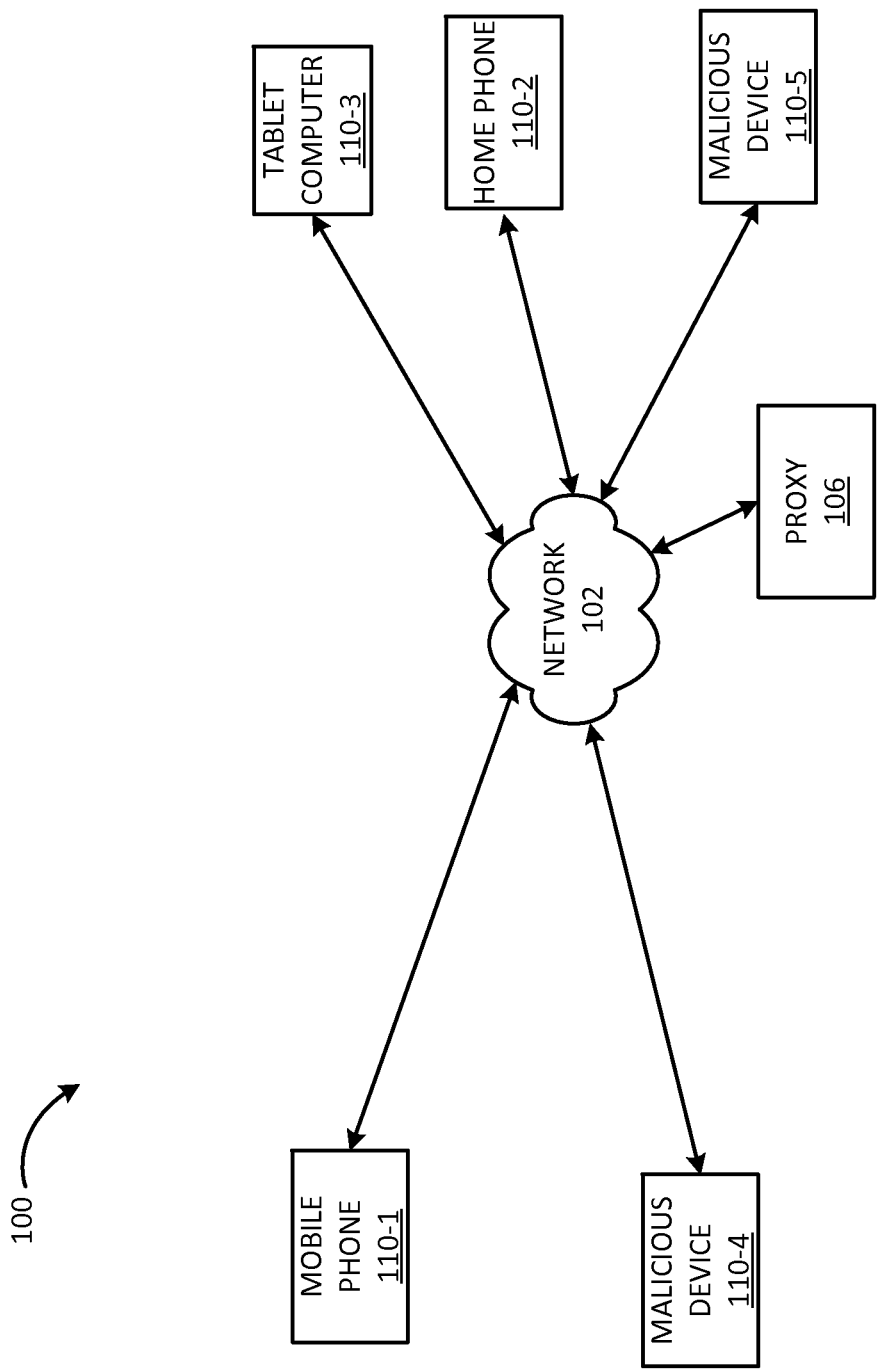
FIG. 1A is a block diagram of exemplary components of a network for implementing embodiments disclosed herein.

FIG. 1A is a block diagram of exemplary components of a network 100 for implementing embodiments disclosed herein. Network 100 includes a proxy 106 and numerous devices 110 (individually, "device 110-*x*") coupled to a network 102. Devices 110 may include, for example, a mobile phone 110-1, a home phone 110-2, and a tablet computer 110-3. Devices 110 may also include malicious devices 110-4 and 110-5.

In network 100, for example, the user of mobile phone 110-1 may wish to call home phone 110-2. The call, or session, may be established using proxy 106 and a session control protocol, such as SIP. Malicious devices 110-4 and/or 110-5, however, may try to disrupt network 100 (e.g., by attacking proxy 106) in a way that would prevent the call from mobile phone 110-1 to home phone 110-2 from going through. As described above, one type of attack that a malicious devices 110-4 and 110-5 may use is a DoS attack or a DDoS attack directed proxy 106.

Network 102 may include a wired or wireless network. Network 102 may include a wireless public land mobile network (PLMN) (e.g., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN. In addition to a wireless network, network 220 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 102 may include a wireless satellite network.

Devices 110 may include mobile telephones, personal digital assistants (PDAs), laptop computers, desktop computers, tablet computers, or another type of computation or communication device. Devices 110 may connect to network 102 via wired, wireless, and/or optical connections. Devices 110 may include user agents (UAs) that implement SIP according to the Internet Engineering Task Force (IETF) document RFC 2543 and document RFC 3261.

Proxy 106 may include a device that facilitates the establishment, definition, and termination of sessions, such as telephone calls, on behalf of devices (e.g., devices 110). Proxy 106 may implement SIP according to the IETF document RFC 2543 and document RFC 3261. Proxy 106 may route requests to a user's location, authenticate and authorize users for services provided by proxy 106, implement call-routing policies, and provide features to users.

SIP is a request/response protocol used for signaling in, for example, voice over IP networks. In SIP, the peer-to-peer relationship between two devices 110 is known as a "dialog." The dialog provides the context to facilitate exchange of messages between devices 110. Messages exchanged between devices 110 can be, for example, either a request or its associated responses. A request and its responses may be referred to as a "transaction." A dialog may include one or more transactions. Various requests are defined in SIP to provide different functionality. For example, an INVITE request is used to initiate a call and a BYE requests is used to end the call.

Figure 1B:
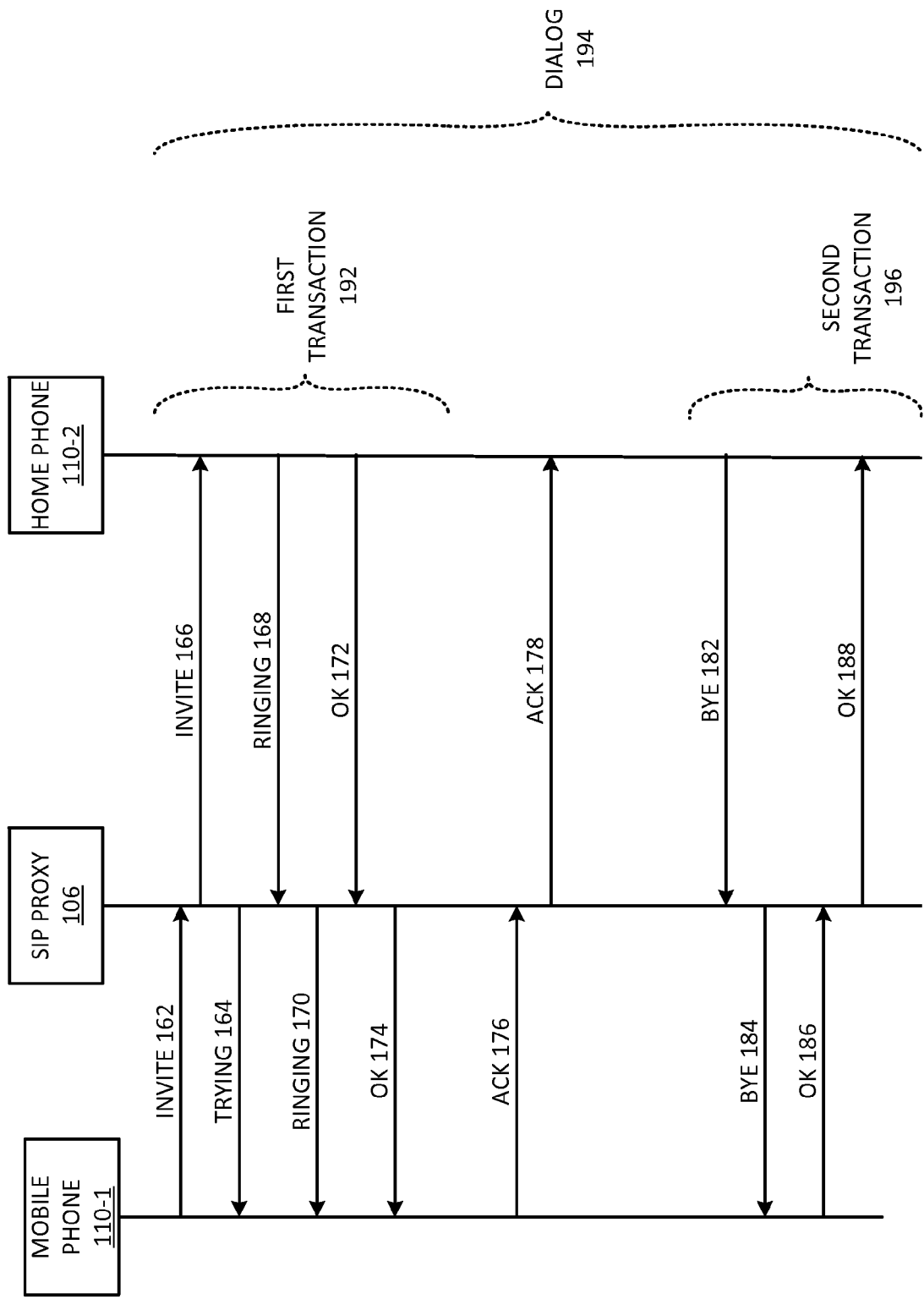
FIG. 1B is a signal diagram of exemplary messages sent between devices in the network of FIG. 1A.

FIG. 1B is a signal diagram of an exemplary dialog including transactions between mobile phone 110-1 and home phone 110-2. As shown, mobile phone 110-1 sends an INVITE request 162 to home phone 110-2 through proxy 106. Proxy 106 intercepts INVITE request 162 and returns a TRYING message 164 to mobile phone 110-1. Proxy 106 also forwards an INVITE request 166 to home phone 110-2. Home phone 110-2 responds with a RINGING message 168 to proxy 106, which proxy 106 forwards as RINGING message 170 to mobile phone 110-1. As further shown in FIG. 1B, if a call is established, home phone 110-2 sends an OK message 172 to proxy 106, which proxy 106 forwards to mobile phone 110-1 as OK message 174. Mobile phone 110-1 sends an ACK message 176 to proxy 106, and proxy 106 sends an ACK message 178 to home phone 110-2. Messages 162 through 174 may be considered a transaction ("first transaction 192") of a dialog 194 between mobile phone 110-1 and home phone 110-2.

If home phone 110-2 wishes to terminate the session, home phone 110-2 sends a BYE message 182 to proxy 106, and proxy 106 sends a BYE message 184 to mobile phone 110-1. In response, mobile phone 110-1 sends an OK message 186 to proxy 106, and proxy 106 forwards an OK message 188 to home phone 110-2. Messages 182 through 188 form another transaction ("second transaction 196") in dialog 194 between mobile phone 110-1 and home phone 110-2.

DoS attacks against SIP-based components (e.g., proxy 106), include three types of attacks: (1) attacks to exploit a protocol implementation flaw, (2) attacks to exploit application-layer vulnerabilities, and (3) attacks that flood a device with messages.

Implementation flaw attacks occur when a specific flaw in the implementation of a component (e.g., proxy 106) is exploited. For example, malicious device 110-5 may send a malicious packet to proxy 106 that causes unexpected behavior in proxy 106, resulting in proxy 106 being unable to service legitimate devices 110. The malicious packet may interact with the software or firmware in proxy 106 to cause the unexpected behavior. Unexpected behaviors include, for example, excessive memory use, excessive disk use, excessive processor use, a system reboot, or a system crash. The unexpected behavior may have resulted from inadequate testing of software running in proxy 106, improper maintenance of software running in proxy 106 (e.g., a bad software patch), etc. The vulnerability that causes the unexpected behavior may reside in various different levels of the network protocol stack, such as the TCP (Transmission Control Protocol) layer, the SIP layer, or in the underlying operating system.

Application-layer vulnerability attacks occur when a feature of the session control protocol (e.g., SIP) is manipulated to deny service to non-malicious users. In other words, a protocol manipulation attack occurs when an attacker sends a legitimate request that deviates from the intended purpose of the protocol in a way to overburden the proxy. These types of attacks include registration hijacking, call hijacking, and media modification.

Message flooding attacks occur when a large number of packets are sent to the component (e.g., proxy 106) in order to overwhelm the processing capacity of that component. In this case, the component is too busy to process all the non-attack, legitimate packets. Flooding attacks can occur from few sources (e.g., one or a limited number of sources) in the case of a DoS attack, or multiple sources (e.g., an unmanageably large number of distributed sources) in the case of a DDoS attack. In case of multiple sources, each attack from each source may individually go undetected, but the combined attack from the sources may overwhelm the component. A flooding attack may include signal flooding (e.g., SIP INVITE requests) or media flooding. In signal flooding, a large amount of SIP requests may be sent to a SIP element.

In a typical DoS attack the source of the attack is usually a single server or a small network of servers. Such attacks may be successfully handled by IP address blocking (e.g., of a finite number of sources) and/or statistical methods involving traffic modeling and rate-limiting techniques at the IP network layer. A more complex attack, and far more difficult to combat, is the DDoS attack. In this case, a network of perhaps millions of unwitting computers (e.g., a "botnet") is commandeered to carry out an attack. Network- and transport-layer (e.g., layers 3 and 4) solutions may fail in such DDoS attacks because it is difficult to create whitelists and blacklists based on network addresses for millions of devices. Likewise, the statistical and rate limiting techniques may be overcome by an attack in which a single malicious packet is generated per malicious source. In this case, each malicious source may not appear malicious, but the aggregate flood of packets from a million hosts to the same target would clearly cause a flooding attack.

Figure 1C:
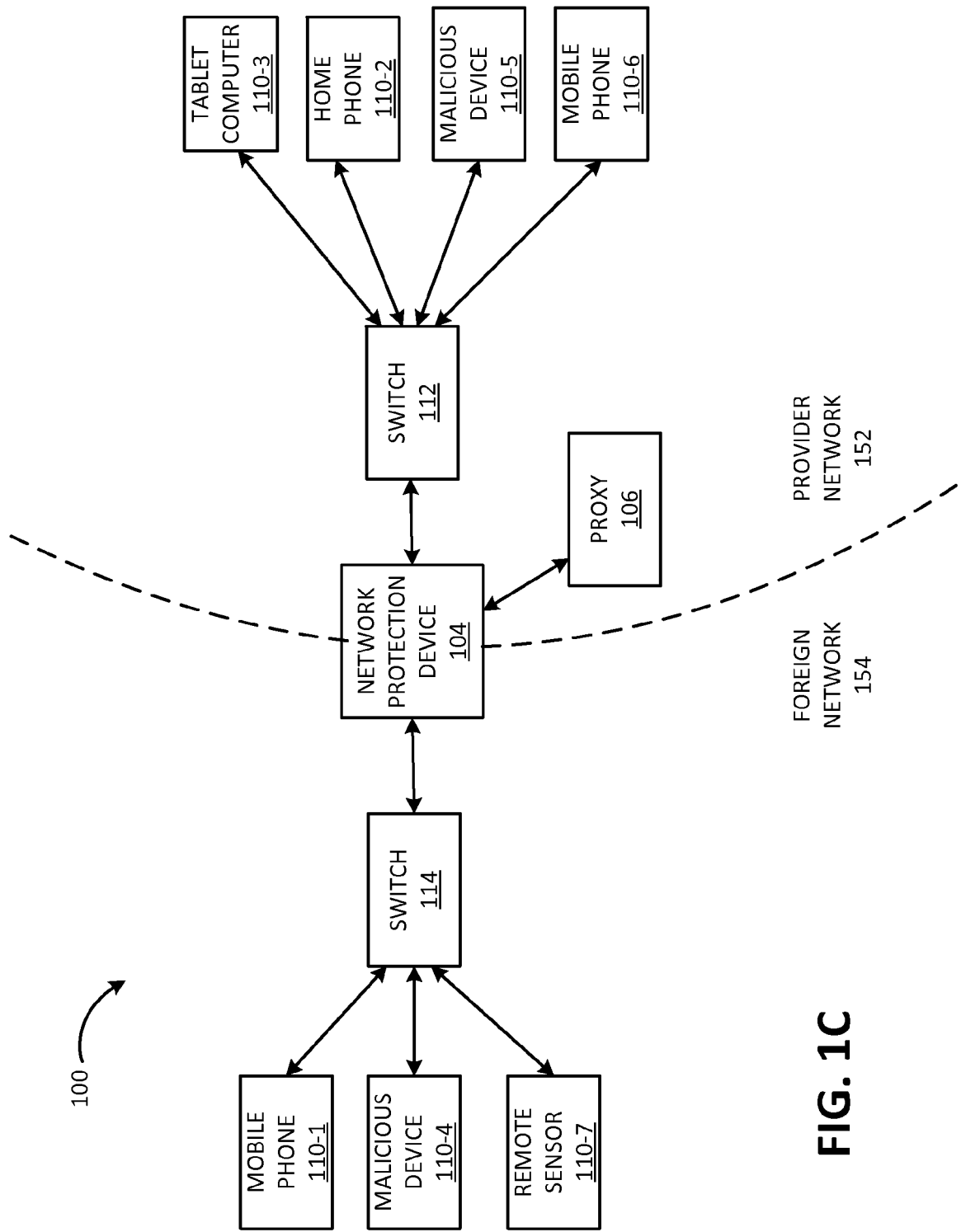
FIG. 1C is a block diagram of the network of FIG. 1A with more detail.

FIG. 1C is a block diagram of network 100 showing additional exemplary components. In addition to those components shown in FIG. 1A, FIG. 1C shows a network protection device 104 (NPD 104), switches 112 and 114, a mobile phone 110-6, and a remote sensor 110-7. FIG. 1C also shows network 100 divided into a provider network 152 and a foreign network 154.

In the embodiment shown, provider network 152 may provide devices 110-3, 110-2, 110-5, and 110-6 with communication services (e.g., using proxy 106). That is, the users of devices 110 in provider network 152 may subscribe to these services. Provider network 152 may deploy NPD 104 to protect provider network 152 from malicious devices in foreign network 154 (e.g., malicious device 110-4). In some embodiments, NPD 104 may also protect provider network 152 from malicious devices in provider network 152 (e.g., malicious device 110-5). In this embodiment, NPD 104 may protect proxy 106 against malicious network traffic, such as a DoS or DDoS attack. NPD 104 may be located to receive traffic from foreign network 154 (e.g., rather than proxy 106 receiving the traffic directly). NPD 104 may analyze and exert control over signaling messages intended for proxy 106. NPD 104 may also analyze and exert control over media streams intended for the media infrastructure (e.g., switch 112) in provider network 152. As shown in FIG. 1C, traffic directed towards proxy 106, from either foreign network 154 or provider network 152, may first go through NPD 104 before reaching proxy 106. NPD 104 may analyze traffic by performing deep-packet inspection (e.g., inspection at the application or seventh layer of the OSI model stack). Based on the analysis, the NPD 104 may determine whether to allow or reject packets (e.g., packets including session signaling or packets including media). NPD 104 is discussed in more detail below with respect to FIG. 3C.

As described above, a DoS attack in network 100 may be directed at proxy 106. By overburdening the processors in proxy 106 with SIP requests, for example, malicious devices 110-4 and 110-5 may attempt to prevent other devices 110 from placing or receiving calls. With NPD 104, however, the process of examining each request for threats may be shifted in part from proxy 106 to NPD 104. In one embodiment, NPD 104 may include higher performance hardware than proxy 106 and may be better suited to handling a DoS attack. NPD 104, therefore, may decrease the processing load on proxy 106 so that proxy 106 may more adequately respond to legitimate traffic as opposed to DoS traffic. In one embodiment, proxy 106 determines whether to accept or reject (e.g., a Boolean determination) an incoming request. NPD 104 may also implement ultra-high speed deep packet inspection (DPI), allowing network 100 to scale to handle real-world traffic volume. With ultra-high speed DPI technology, individual IP addresses may be marked as malicious, for example, even based on a single malicious packet, when application-layer information is obtained and processed for decision making at wireline speeds. Embodiments disclosed herein allow for the categorization of a packet as malicious based on application-layer SIP information, such as the SIP header structure or pattern, or based on fields in the SIP header. Embodiments disclosed herein allow for the capability to distinguish an attack from millions of IP addresses using this application-layer information to discriminate between legitimate and malicious traffic.

FIGS. 1A and 1C show exemplary components of network 100. In other implementations, network 100 may include fewer, additional, or a different arrangement of components. For example, network 100 may include additional proxies for receiving and forwarding session control messages. Further, in other implementations, any components of network 100 may perform the tasks performed by one or more other components of network 100.

Figure 2:
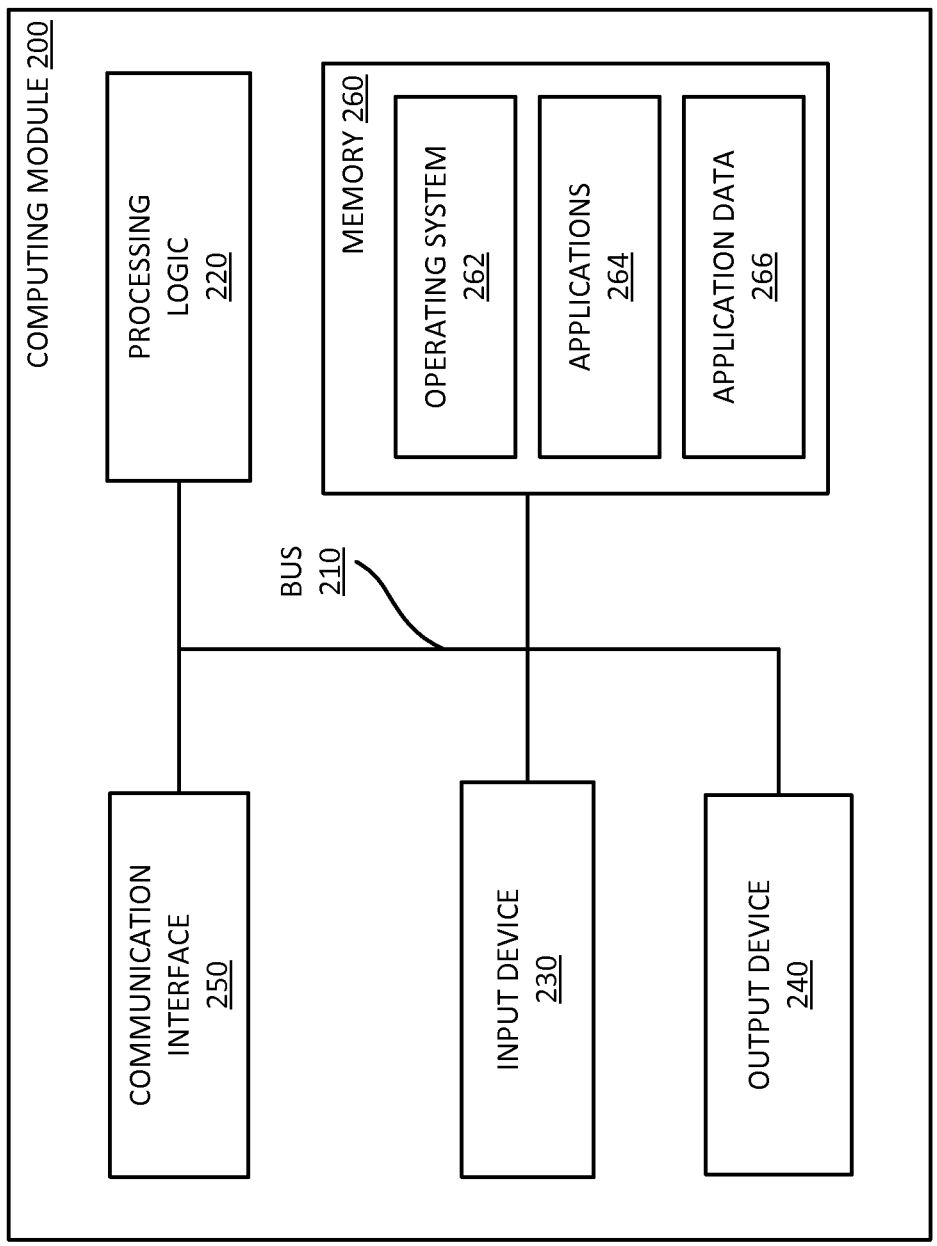
FIG. 2 is a block diagram of exemplary components of a computing module 200.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), a multi-core processor, a reduced-instruction set code (RISC) processor, etc.

Input device 230 may allow a user to input information into computing module 200. Input device 230 may include a keyboard, a mouse, a pen, a microphone, a remote control (e.g., remote control 260), an audio capture device, an image and/or video capture device, a touch-screen display, etc. Some devices, such as home phone 110-2 may include a keypad for entering telephone numbers when calling a party. Mobile phone 110-1 may include a keypad or a touch screen for entering numbers for calling a party. On the other hand, remote sensor 110-7, network protection device 104, and SIP proxy 106 may be managed remotely and may not include input device 230. In other words, some devices may be "headless" and may not include a keyboard, for example.

Output device 240 may output information to the user. Output device 240 may include a display, a printer, a speaker, etc. For example, mobile phone 110-1 may include a liquid-crystal display (LCD) for displaying information to the user, such as the name and/or number of a calling party. Headless devices, such as proxy 106, NPD 104, and switches 114 and 112 may be managed remotely and may not include output device 240.

Input device 230 and output device 240 may allow a user to activate and interact with a particular service or application, such as telephone application to call a party. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include Linux, Windows, OS X, OpenSolaris, Unix, etc. In the case of mobile phone 110-1, for example, operating system 262 may include MeeGo, Android, WebOS, iOS, Symbian, etc. Applications 264 and application data 266 may provide network services or include applications, depending on the device in which the particular computing module 200 is found.

Computing module 200 may perform the operations described herein in response to processing logic 220 executing software instructions contained in a computer-readable medium, such as memory 260. A computer-readable medium include a physical or logical memory device. The software instructions may be read into memory 260 from another computer-readable medium or from another device via communication interface 250. The software instructions contained in memory 260 may cause processing logic 220 to perform processes that are described herein.

Figures 3A, 3B:
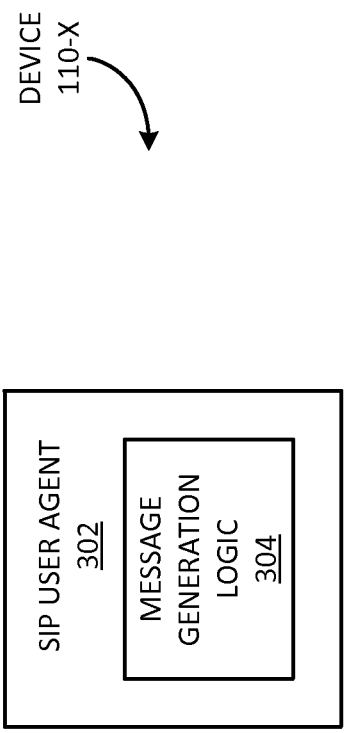
FIG. 3A is a block diagram of exemplary components of the devices of FIGS. 1A and 1C.
FIG. 3B is a diagram of an exemplary Session Initiation Protocol (SIP) header in an INVITE request message.

FIG. 3A is a block diagram of exemplary components of device 110-x. Devices 110 may each include a user agent 302, which may further include message generation logic 304. The components of device 110-x are shown for ease of understanding and simplicity. Device 110-x may include more, fewer, or a different arrangement of components.

User agent 302 may use a protocol (e.g., SIP) to establish, define, and terminate sessions with other devices. A session may include a lasting connection between two devices that may carry a stream of packets from one device to the other and/or vice versa. User agent 302 may perform the functions of a user agent client (UAC) and/or a user agent server (UAS). A UAC is a logical entity that creates a new request, and then uses client transaction state machinery to send it. The role of UAC may last for the duration of that transaction. In other words, if device 110-x initiates a request, user agent 302 acts as a UAC for the duration of that transaction. On the other hand, a UAS is a logical entity that generates a response to a SIP request. The response accepts, rejects, or redirects the request. The role of UAS may last for the duration of that transaction. In other words, if device 110-x responds to a request, user agent 302 acts as a UAS for the duration of that transaction.

When generating a SIP request, user agent 302 may employ message generation logic 304 to create the request and the header for the request, such as the header to an INVITE message. FIG. 3B shows an exemplary SIP header 310 generated by user agent 302. SIP includes flexible grammar and protocol features. The rules of the grammar of SIP are flexible and allow, for example, a number of variations in the header field. For example, while the SIP standard may specify what is included in a SIP header the order of information, the format of information, the information itself, may be implemented in many different ways. Each manufacturer may implement message generation logic 304 differently. Each manufacturer may also implement message generation logic 304 differently for different products, for different hardware versions of the same product, for different software and/or firmware versions of the same product, etc. As a result, headers for SIP requests may take on different characteristics (e.g., different fingerprints) depending on user agent 302 and message generation logic 304. Thus, various permutations of the header can occur, which forms the basis of identifying the user agent that created the header.

FIG. 3B is an exemplary SIP header 310 for an INVITE request message. Header 310 may have been generated by message generation logic 304, for example, for an INVITE message sent from Alice to Bob. As shown in FIG. 3B, header 310 includes the following fields: a Via field, a Max-Forwards field, a To field, a From field, a Call-ID field, a CSeq field, a Contact field, a Content-Type field, and a Content-Length field. In addition to those fields, header 310 includes a request line or field (e.g., the first line of header 310), which includes the method (e.g., INVITE), a request-URI (e.g., bob@giloxi.com), and the SIP version (e.g. SIP/2.0). Header 310 is exemplary and may include additional or fewer fields. Further the information in header 310 is exemplary. The fields in header 310 are described in more detail below.

The Via field may include the address (e.g., pc33.atlanta.com) at which a user (e.g., Alice) is expecting to receive responses to the request. The Via field may also include a branch parameter that uniquely identifies this transaction.

The To field may include the desired or logical recipient of the request or the address-of-record of the user or resource that is the target of this request. For example, the To field may include a display name (e.g., Bob) and a SIP URI or SIPS URI (e.g., sip:bob@biloxi.com) to which the request is originally directed. If a dialog has already been established, the To field may include a To tag, which may identify the peer of the dialog. If the SIP request is outside a dialog, then the To field may not include a To tag.

The From field indicates the logical identity of the initiator of the request, possibly the user's address-of-record. For example, the From field may also include a display name (e.g., Alice) and a SIP URI or SIPS URI (e.g., sip:alice@atlanta.com) that indicate the originator of the request. The From field may also include a tag parameter that includes a string (e.g., a random string such as 1928301774) added to the URI by the originating user agent, for example. The string may be used for identification purposes.

The Call-ID field may acts as a globally unique identifier for a series of SIP messages, such as a series of SIP messages to establish a session. For example, the unique identifier for the session may be generated by the combination of a random string and the user agent's host name or IP address. The combination of the To tag, From tag, and Call-ID may completely define a peer-to-peer SIP relationship between originator (e.g., Alice) and target (e.g., Bob) and is referred to as a dialog.

The CSeq or Command Sequence field may serve as a way to identify and order transactions. For example, the CSeq field may include an integer and a method name. The integer may be incremented for each new request within a dialog and may include a traditional sequence number.

The Contact field may include a SIP or SIPS URI that can be used to contact that specific instance of the user agent for subsequent requests. The SIP or SIPS URI may represent a direct route to contact the originator (e.g., Alice), usually composed of a username at a fully qualified domain name (FQDN). While an FQDN is preferred, many end systems do not have registered domain names, so IP addresses may be used. While the Via header field, described above, indicates where to send a response to the request, the Contact field indicates where to send future requests.

The Max-Forwards field may be used to limit the number of hops a request can make on the way to its destination. The Max-Forwards field may include an integer that is decremented by one at each hop.

The Content-Type field (not shown) describes the Internet media type of the message body, such as whether the body of the message has been encoded using compression. The Content-Length field may indicate the length (e.g., an octet or byte count) of the message body.

SIP dialog is identified by a combination of the Call-ID, From tag and To tag. A SIP transaction is identified by the branch parameter of the Via header and the Method name in the CSeq field. These fields can be used to construct respective dialog ID and transaction ID identifiers. Both the dialog ID and the transaction ID may be used by embodiments to maintain the corresponding state.

FIG. 3C is a block diagram of exemplary components of NPD 104. NPD 104 may include content-addressable memory (CAM) 312, network processing logic 318, and/or fingerprinting logic 314. The components of NPD 104 are exemplary. NPD 104 may include additional, fewer, or a different arrangement of components. Further, any one component of NPD 104 may perform the functions described as being performed by one or more other components of NPD 104.

CAM 312 may be implemented in NPD 104 for its high-speed searching capabilities. CAM 312 may include a binary CAM, which stores information using a system of 0s and 1s. Alternatively, CAM 312 may include a ternary CAM (TCAM), which uses a system of 0s, 1s and *s (e.g., a do-not-care (DNC) state). Because of the DNC state, one input may match multiple entries in the TCAM. In case of multiple matches, TCAM may return the first match or indices of multiple matches. Entries present in TCAM may be compared in parallel and one match or an index of multiple matches may be returned by the TCAM. The lookup time for a CAM may be approximately 4-10 nano seconds, for example.

Network processing logic 318 allows NPD 104 to extract and examine data from incoming packets. Processing logic 318 may include an array of one or more central processing units capable of handling network related functions and performing deep packet inspection at carrier-class rates. In one embodiment, processing logic 318 may determine if a received session control protocol message (e.g., a SIP message) is a request for a new dialog or transaction. If so, then network processing logic 318 may fingerprint the request to determine if the request should be forwarded to proxy 106. In this embodiment, if network processing logic 318 determines that the request is part of an ongoing dialog or transaction, then processing logic 318 may pass the message to proxy 106 without fingerprinting the request. In another embodiment, network processing logic 318 may fingerprint all requests whether part of an existing transaction or dialog.

Network processing logic 318 may include the Intel IXP 2800, which is capable of forwarding packets at 10 Gb/s. The IXP 2800 includes sixteen programmable, multi-threaded micro-engines that may support 23.1 giga-operations per second. Network processing logic 318 may include the XLS processor from RMI. Network processing logic 318 may include the C-Port processor family from Freescale. The XLS processor and the C-Port processor family may achieve deep packet inspection at rates greater than 10 Gig. A customized FPGA solution (e.g., in conjunction with a multi-core architecture) may achieve deep packet inspection rates of greater than 10 Gig (e.g., 40 or 100 Gig). A combination of the above architectures may also be used.

Fingerprinting logic 314 may generate a fingerprint of a session control protocol message, such as a fingerprint of the header of a SIP request. A fingerprint of a SIP request may define the unique pattern of the SIP header and may, therefore, identify the SIP user agent that generated the SIP request. The act of fingerprinting by fingerprinting logic 314 may be considered a form of deep-packet inspection, e.g., inspecting the packet at the application (seventh) layer as opposed to the network (third) layer of the OSI model stack.

Fingerprinting logic 314 may use information in just one field of a header (e.g., the Call-ID field), or may use more than one field. Fingerprinting logic 314 may use a number of header fields, the content of the header fields, and/or the ordering of the header fields. Fingerprinting user agents may be useful for protecting against a DDoS attack (e.g., a botnet-generated flood of requests) discussed earlier. Since each attack source may be identified by the unique fingerprint contained in the attack traffic, attack traffic may be dropped without identifying its source (e.g., via a network address).

Fingerprinting logic 314 may determine characteristics of a packet (e.g., a SIP request) to identify the type of user agent that originated the SIP request. Fingerprint logic 314 may include a regular expression engine to match a regular expression (e.g., fingerprint or pattern) with entries in CAM 312. Fingerprinting logic 314 may employ active or passive techniques. Active fingerprinting may include probing the user agent by sending a request to the user agent and then observing the response of the user agent. It is possible that the user agent can detect this active type of fingerprinting. Passive fingerprinting may include observing requests generated by a user agent. Passive fingerprinting may not be detected by the user agent being fingerprinted. In one embodiment, fingerprinting logic 314 uses passive fingerprinting because probing every user agent in network 100 may be impractical in a carrier-class environment. For example, probing every user agent in network 100 would present performance issues, which may even make a DoS attack easier to implement.

The header of a SIP request may include mandatory fields. In one embodiment, all request headers must include the To, From, CSeq, Call-ID, Max-Forwards, and Via fields for the SIP header to be considered valid and not be dropped by NPD 104. The SIP standard may allow for optional or custom header fields. These optional and/or non-required fields may be taken into consideration by fingerprinting logic 314 (e.g., they may form the basis of the fingerprint) or they may be ignored by fingerprinting logic 314.

Fingerprinting logic 314 may fingerprint the header of a SIP request. SIP is a structured layered protocol in which the lowest layer defines the protocol syntax and encoding. The encoding is specified using an augmented Backus-Naur Form grammar. The rules defined in the grammar are flexible and allow a number of variations in the header fields such as ordering of header elements and amount of white space on either side of a colon present in the header. Due to the flexible nature of the grammar it is possible to produce a large number of variations in the SIP header. As a result user agents from different vendors can produce their own unique headers during a SIP dialog. The unique SIP headers produced forms the basis for identifying user agents from different vendors.

Fingerprint logic 314 may detect structural differences between user agents by comparing the underlying parse tree for several messages. The differences may be identified based on: (1) the number of header elements; (2) the content of header elements; and (3) the ordering of header elements. Fingerprinting logic 314 may identify structural features of the SIP protocol and extract and recognize the expression of these features in the packet.

In one embodiment, the features of the header may be identified by parsing the header using the Abdelnur technique, for example. The Abdelnur technique is described in "Advanced Network Fingerprinting," by Humberto J. Abdelnur, Radu State, and Olivier Festor. Using this technique, the header is parsed to form a parsing tree. Different headers (e.g., different vendors, hardware versions, software/firmware versions) may be associated with a different parsing tree. Each parsing tree may be identified by a string of characters, which is the fingerprint of the tree and the user agent. Headers from known non-malicious user agents may be fingerprinted. For example, headers from well-known vendors such as Cisco, Nortel, Broadsoft, etc., may be fingerprinted. Known malicious user agents may also be fingerprinted. For example, the fingerprint of the SIPp proxy test software is known. While SIPp itself may not be malicious, it would be an anomaly (and possibly malicious) to receive a phone call having the SIPp fingerprint. In this case, therefore, the SIPp fingerprint may be blacklisted, for example. When a header is received from an unknown user agent, the header may be fingerprinted and compared with fingerprints of known malicious user agents and known non-malicious fingerprints. To find the most adequate match, a matching assignment based on Nash Equilibrium may be used, for example. Additionally, fingerprints may be refined using machine learning techniques. If the computing complexity required for machine learning is beyond the capability of NPD 104, then the machine learning may be performed offline and fed to the NPD 104. The learning system may identify and classify user agents based on their header patterns and previous interactions (e.g., malicious or non-malicious) with SIP components (e.g., proxy 106).

Fingerprint logic 314 may be capable of generating one or more fingerprints of a packet, the fingerprints being of differing levels of complexity. For example, fingerprinting logic 314 may base one fingerprint on only the Call-ID field. Fingerprinting logic 314 may base another fingerprint on the Call-ID field and other fields. One fingerprint may be generated in as a short period of time, while the other may take longer. Fingerprint logic 314 may generate fingerprints in parallel or in series if the earlier fingerprint(s) are inconclusive, for example. In one embodiment, fingerprint logic 314 may generate a fingerprint using a hash function so that the resulting fingerprint is of a uniform length for searching and indexing CAM 312. For example, a cyclic redundancy check (CRC) (e.g., a 32 bit function) may be used to generate the fingerprint for indexing CAM 312.

As described above, the Call-ID field includes a globally unique identifier used (e.g., in part) for identifying a SIP dialog. The Call-ID field may be generated based on the combination of a randomly generated string and the user agent's host name or IP address. Studies have shown, however, that the supposedly "random" Call-ID can be predicted depending upon the random number generation method chosen by the vendor of device 110-*x*. As a result, information (e.g., the identity of the vendor, the vendor's hardware or software version) is leaked. This leaked information can be exploited by fingerprinting logic 314.

In one embodiment, upon receiving a SIP request (e.g., an INVITE message), fingerprint logic 314 (e.g., a regular expression processor) can parse the Call-ID from the SIP header and may compare the pattern to the set of stored patterns in a table in CAM 312 to determine whether it corresponds to a known pattern or a new pattern.

For example, the Call-ID of request messages generated by the SIP performance and test tool SIPp follows the following pattern: % u-% p@% s<unsigned int>-<PID>@<local IP>. Therefore, messages originating from SIPp can be identified based on its Call-ID. Because, SIPp is a widely available and easy to use tool to launch large volumes of attack traffic, the Call-ID fingerprinting tool is an important defense. Fingerprinting the Call-ID field may be performed faster than fingerprinting the entire header and may provide performance enhancements. On the other hand, fingerprinting the Call-ID field has a smaller decision space than fingerprinting the entire header, and therefore may result in more false positives and false negatives.

The Call-ID field is not the only field in the SIP header that includes supposedly random information. The From tag, included in the From field, may include supposedly random information that actually follows patterns depending on the version of SIP user agent 302. The To tag, included in the To field, may also include supposedly random information that actually follows patterns depending on the vendor/version of SIP user agent 302. The To tag, however, may not be as useful to fingerprint because flood of messages in a DoS attack may be out of any dialog and, thus, may not be included in the To field. Further still, Via branch field also includes information that is supposedly random information that actually follows patterns depending on the vendor/version of SIP user agent 302. The pattern information stored, and corresponding vendor, may also be stored in CAM 312 for pattern matching. Further sill, the CSeq field may include supposedly random information that actually follows patterns depending on the vendor/version of SIP user agent 302.

Fingerprint logic 314 may include regular expression logic. The regular expression logic may match a fingerprint (e.g., determined by fingerprint logic 314) with a store of fingerprints stored in CAM 312, for example.

Figure 4A:
FIG. 4A is a diagram of an exemplary blacklist.

FIG. 4A is a block diagram of an exemplary blacklist 412. Blacklist 412 may be used to identify fingerprints associated with requests that should be blocked. Fingerprints may be added to blacklist 412 through a learning process, as described below with respect to FIG. 5, or by a network administrator manually adding a fingerprint to blacklist 412. As shown in FIG. 4A, blacklist 412 may include a header fingerprint field 414 and a blacklist flag field 416.

Fingerprint field 414 may identify characteristics of a signaling message that identify the user agent (e.g., vendor information, hardware version, and/or software version) that generated the signaling message. Fingerprint field 414 may include a fingerprint associated with the header of a known malicious SIP user agent. In another embodiment, fingerprint field 414 may include a fingerprint associated with the Call-ID field in the header of a known malicious SIP user agent.

Flag field 416 includes, for example, a Boolean value indicating whether a signaling message associated with the corresponding fingerprint should be blocked. In one embodiment, flag field 416 is not included in blacklist 412. In this embodiment, the mere presence of a fingerprint in fingerprint field 414 in blacklist 412 is sufficient to indicate that a request associated with the fingerprint should be blocked, for example.

FIG. 4B is a block diagram of an exemplary whitelist 422. Whitelist 422 may be used to identify fingerprints associated with requests that should not be blocked. Fingerprints may be added to whitelist 422 through a learning process, as described below with respect to FIG. 5, or by a network administrator manually adding a fingerprint to whitelist 422. As shown in FIG. 4B, whitelist 422 includes a fingerprint field 424 and a flag field 426.

Fingerprint field 424 may identify characteristics of a signaling message that identify the user agent (e.g., vendor information, hardware version, and/or software version) that generated the signaling message. For example, fingerprint field 424 may include a fingerprint associated with the header of a known non-malicious SIP user agent. In another embodiment, fingerprint field 424 may include a fingerprint associated with the Call-ID field in the header of a known non-malicious SIP user agent.

Flag field 426 includes, for example, a Boolean value indicating whether a signaling message associated with the fingerprint in fingerprint field 424 should be allowed. In one embodiment, flag field 426 is not included in whitelist 422. Rather, the mere presence of a fingerprint in fingerprint field 424 in whitelist 422 is sufficient to indicate that a request associated with the fingerprint should not be blocked, for example.

In one embodiment, blacklist 412 and whitelist 422 may be combined into a single table. In this embodiment, a flag field may be included that indicates whether the associated request should be blocked or not (e.g., a Boolean value).

Figure 6A:
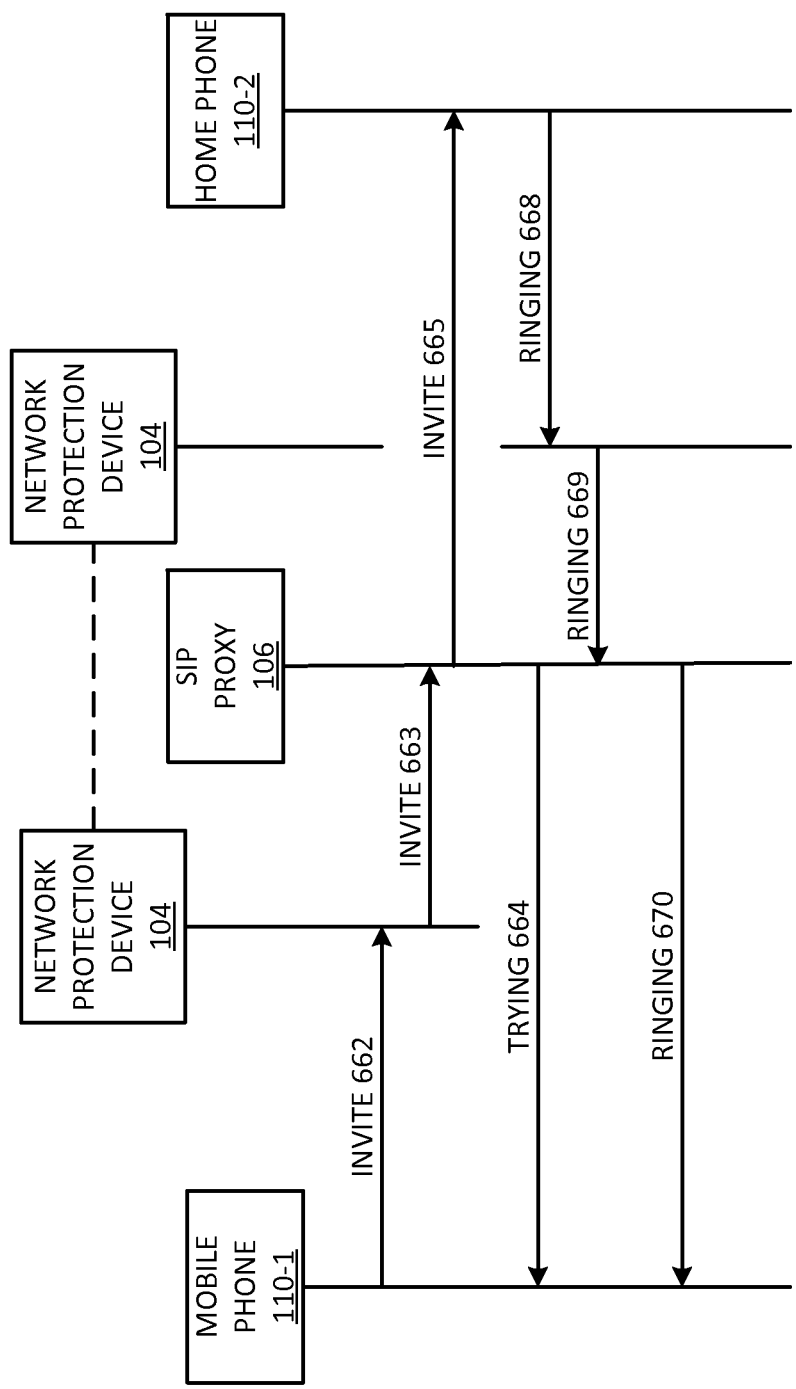
FIGS. 6A and 6B are signal diagrams of messages sent between devices of the network of FIG. 1C.

FIG. 5 is a flowchart of an exemplary process 500 for detecting malicious user agents, detecting DoS attacks, and/or preventing DoS attacks. Process 500 may begin when the user of mobile phone 110-1 wishes to call home phone 110-2. In this case, message generation logic 304 of SIP user agent 302 in mobile phone 110-1 generates a SIP INVITE request 662 that includes a SIP header with a Call-ID field. As discussed above, the request may include telltale signs of the device's hardware and/or software version. As shown in FIG. 6A, mobile phone 110-1 sends INVITE message 662 to NPD 104 (e.g., in the direction of proxy 106 and home phone 110-2). The session control protocol message is received (block 502) by, for example, network processing logic 318 in NPD 104.

If the received session control message is part of an ongoing transaction or dialog (block 504: NO), then the session control message may be forwarded to proxy 106 (block 506). In this case, the user agent in mobile phone 110-1 may have already been fingerprinted and found to be non-malicious. In other embodiments, a session control message may be fingerprinted even if the message is part of an ongoing transaction or dialog. Network processing logic 318 may determine (e.g., in conjunction with CAM 312) whether a message is part of an existing transaction and/or dialog or not.

If the received session control message is a request for a new dialog (block 504: YES), then the message may be fingerprinted (block 508). In one embodiment, if the received session control message is a request for a new transaction, even if part of an established dialog, then the request message may be fingerprinted (block 508). In the example of FIG. 6A, INVITE message 662 is a request for a new dialog.

The request is fingerprinted (block 508). NPD 104 may employ fingerprint logic 314 to generate the fingerprint. For example, the fingerprint may include the fingerprint of the entire header, for example, or a portion of the header. In one embodiment, the fingerprint may be based on one field in the header of the request, such as the Call-ID field. In one embodiment, the fingerprint may conform to a uniform length. In another embodiment, two fingerprints may be derived from the request message. For example, NPD 104 may fingerprint the Call-ID field and the entire header field. In this embodiment, the Call-ID field may be generated first because it may take less processing cycles to determine.

If the fingerprint is in the blacklist (block 510: YES), then the request may be rejected (block 512). In this example, NPD 104 may determine whether the fingerprint generated above at block 504 is in blacklist 412 stored in CAM 312. This comparison may take one clock cycle because of the speed of CAM 312. Rejecting a request may include dropping the SIP request packet and/or not forwarding the SIP request packet to SIP proxy 106. In one embodiment, rejected requests are stored for further analysis by a network administrator, but are not forwarded to proxy 106. In the example of FIG. 6A, the fingerprint of INVITE message 662 is not in the blacklist, so INVITE message 662 is not rejected.

If the fingerprint is in the whitelist (block 514: YES), then the request may be accepted (block 516). In this example, NPD 104 may determine whether the fingerprint generated above at block 508 is in whitelist 422 stored in CAM 312. Accepting the request may include forwarding the request to proxy 106. In the example of FIG. 6A, the fingerprint of INVITE message 662 is in the whitelist, so INVITE message 662 is forwarded to proxy 106 as INVITE message 663.

If the fingerprint is not in the blacklist (block 510: NO) and not in the whitelist (block 514: NO), then the request may be held (e.g., for a short time) for further analysis (block 518). Such further analysis may include determining whether the request is associated with an anomalous event (block 520). A request may be held for a fraction of a second (tenths, hundredths, or thousandths of a second, etc), or for a second or more. A user agent is said to trigger an anomalous event if, for example, the user agent sends the request with the intention of causing a DoS attack by using one or more techniques described above.

For example, an anomalous event may include a request formatted in a way to exploit a known implementation flaw (even though the flaw may be patched in proxy 106), a flood of messages with the same transaction ID, a flood of requests with the same unknown or unrecognized fingerprint, a flood of out-of-state responses, a spoofing attack, a flood of requests or messages with changing fingerprints, or a message that exploits a feature of SIP in an unintended way. The anomalous event may occur concurrently or within a window of time from receipt of the message fingerprinted with the message fingerprinted at block 508. The window of time may be a fraction of a second (e.g., 0.01 second, 0.1 second, etc.) or one or more seconds. The anomalous event may occur (1) in the same transaction and dialog as the fingerprinted message, (2) in a different transaction but the same dialog as the fingerprinted message, or (3) in a different transaction and different dialog as the fingerprinted message. The anomalous event may occur (1) at the same network protection device and/or proxy as the fingerprinted message, or (2) a different network protection device and/or proxy as the fingerprinted message.

If the request is associated with an anomalous event (block 520: YES), then the request may be rejected (block 522). For example, if the number of requests with the identical unknown fingerprint (e.g., all being held at block 518) exceeds a threshold, then all such SIP requests may be blocked. Alternatively, if the number of requests associated with any unknown fingerprint exceeds a threshold (e.g., all being held at block 518), then all such SIP requests may be blocked. In one embodiment, the unknown fingerprint may be added to the blacklist (block 524) if the fingerprint is associated with an anomalous event.

If the request is not associated with an anomalous event (block 520: NO), then the request may be accepted (block 526) and the fingerprint may be added to the whitelist (block 528). For example, if the held request is not associated with a flood of requests (e.g., at the same time being held at block 518), then the fingerprint may be added to whitelist 422. In one embodiment, the fingerprint is not added to whitelist 422 until a threshold number of non-malicious requests are received over a period of time. In this case, the fingerprint may be added to a "greylist" until it transitions to either whitelist 422 or blacklist 412.

With respect to fingerprinting a request (block 508), a combination of a Call-ID fingerprint and a header fingerprint may be used. The Call-ID fingerprint may be effective for large majority of the well known user agents (e.g., vendors, hardware versions, and/or software versions). The header fingerprint may be used as a supplement to resolve ambiguous Call-ID field fingerprints or more difficult Call-ID fingerprints (e.g., a Call-ID field that cannot easily be fingerprinted). In this embodiment, the NPD 104 may execute the fingerprint (block 508) and lookup (blocks 510 and 514) process in two phases. Upon the first phase being inconclusive, the second phase may be executed. In this two-phase system, a learning algorithm may improve the accuracy of the first phase based on results of the second phase.

Figure 6B:
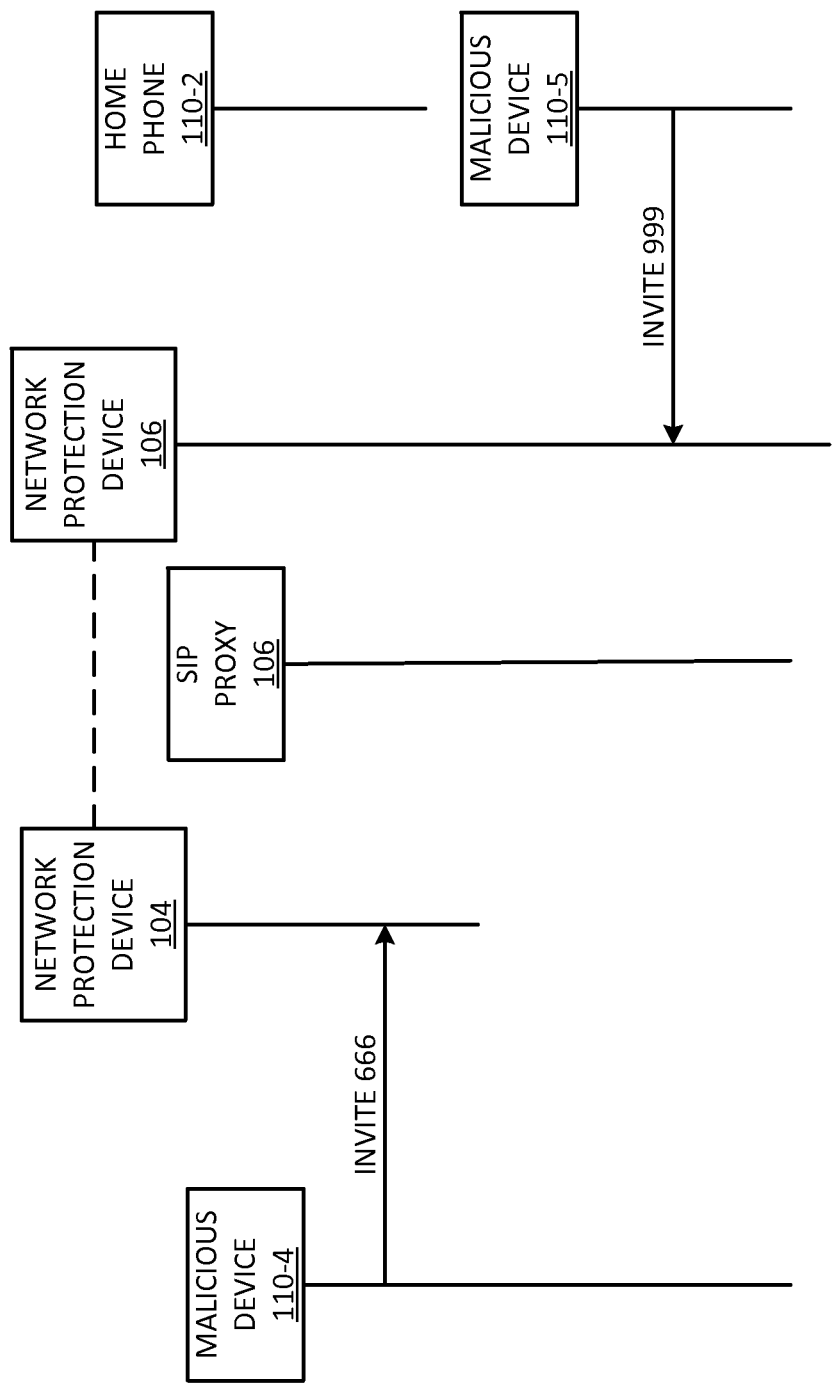

FIG. 6B is an exemplary signal diagram of session control messages. In FIG. 6B, malicious device 110-4 sends an INVITE request 666 to NPD 104. In this example, NPD 104 fingerprints the request (block 508) and recognizes the fingerprint of a malicious user agent (block 510: YES). Thus, INVITE message 666 is dropped by NPD 104 and does not reach proxy 106.

As shown in FIG. 6B, malicious device 110-5 also sends an INVITE request 999 to NPD 104. In this example, NPD 104 fingerprints the message (block 508), but does not recognize the fingerprint of the user agent (block 510: NO, block 514: NO) and holds the message for further analysis (block 518) and determines if there is an anomalous event (block 520).

For example, a sudden influx of requests (e.g., greater than a threshold) with the same unknown fingerprint (e.g., a DoS attack) may be considered an anomalous event (block 520: YES). An anomalous event (block 520: YES) may include INVITE message 999 being formatted in a way to exploit a known implementation flaw (whether or not the flaw exists in proxy 106). An anomalous event (block 520: YES) may include the message (e.g., and a sudden influx of other requests with or without the same fingerprint) implementing a session protocol feature that in an unintended way. In this case, NPD 104 determines that INVITE message 999 is from a malicious user agent, drops INVITE message 999, and adds the fingerprint to blacklist 412 (block 524).

Figure 7:
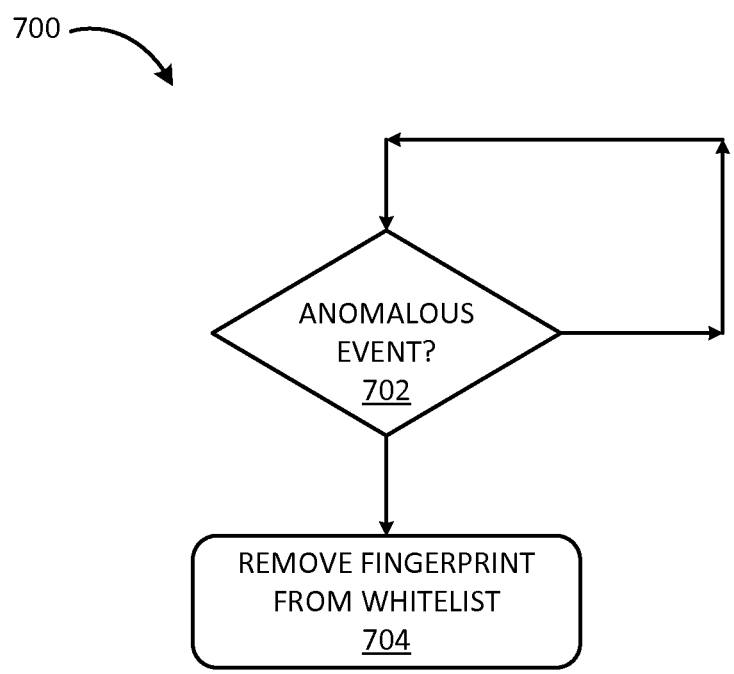
FIG. 7 is a flowchart of a learning process for determining malicious user agent fingerprints.

FIG. 7 is a flowchart of an exemplary process 700 for detecting malicious user agents and removing fingerprints from blacklist 412. As shown in FIG. 5, after accepting a request (block 516 and block 528), process 500 may continue to process 700. In process 700, if an anomalous event is detected (block 702), then the fingerprint of the request associated with the anomalous event may be removed from whitelist 422 (block 704). In this manner, if a user agent that was previously associated with non-malicious requests suddenly becomes associated with malicious requests, then the fingerprint may be removed from whitelist 422. Such an event may occur, for example, if a non-malicious user agent is co-opted by a malicious agent. In this embodiment, the fingerprint may not be added to blacklist 412 because there would presumably still be non-malicious user agents with the same fingerprint. In another embodiment, however, the fingerprint associated with the anomalous event may be added to blacklist 412. For example, if a DoS attack is underway, it may be preferable to deny all requests with that same fingerprint even if the fingerprint is associated with a non-malicious user agent.

In one embodiment, user agent 302 may insert a fingerprint into the header of a session control message (e.g., in a custom header field or as part of an existing field, such as the Call-ID field). For example, user agent 302 could generate a fingerprint from the hash (e.g., a one-way cryptographic function) of the combination of a shared secret with other time-varying information. The secret would be shared between the manufacturer of device 110-*x* (e.g., user agent 302) and provider network 152 (e.g., NPD 104), and not shared with malicious agents. The time-varying information may include the time (e.g., the number of minutes past a predetermined time), for example. Thus, the fingerprint associated with user agent 302 would be constantly changing (e.g., changing every minute or time increment). NPD 104 may populate CAM 312 periodically (e.g., every minute) with valid fingerprints for the next time increment while removing fingerprints from the previous time increment, thus keeping two or three fingerprints (e.g., a window of two or three minutes of fingerprints) in CAM 312 associated with user agent 302 to avoid synching problems, for example. NPD 104 would then extract a fingerprint from the header of received messages, and if a match is found in CAM 312, the message may pass; if not, the message may be blocked. Although the fingerprint may be transmitted in the clear, the shared secret would remain secret because of the one-way cryptographic hash function. Thus, it would be computationally infeasible for someone to mimic user agent 302 (e.g., spoof the fingerprint) without first extracting the shared secret from device 110-*x*, which may be very difficult. A manufacturer may generate a different shared secret for each different model of device 110-*x*, for each different hardware version of device 110-*x*, and/or for each different software/firmware version of device 110-*x*. Thus, if a shared secret is disclosed to a malicious agent, the fingerprints associated with the shared secret may be blacklisted or greylisted. While not all manufacturers may choose to insert such fingerprints into their devices 110, those that do may reduce the load on NPD 104 and help guarantee passage of their messages. Time periods other than one minute are possible, such as every ten seconds (e.g., resulting in a twenty or thirty second window rather than a three minute window).

The foregoing description provides illustration and description, but is not intended to be exhaustive or to limit the embodiments to the precise form disclosed. Modifications and variations are possible in light of the above teachings or may be acquired from practice of the invention. For example, while series of acts have been described with regard to the flowcharts of FIGS. 5 and 7, the order of the acts may differ in other implementations. Further, non-dependent acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as clients 110, connected to a network. Further, a combination of such protocols may be applied in various parts of the overall system.

While fingerprinting is described as a form inspecting the packet at the application (seventh) layer, fingerprint logic 314 may also or alternatively inspect the messages at other layers, such as the network (third) layer of the OSI model stack.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  receiving a session control protocol request message;
  determining whether the session control protocol request message is associated with an ongoing session control dialog or an ongoing session control transaction;
  fingerprinting the session control protocol request message, to generate a fingerprint, in response to a determination that the session control protocol request message is not associated with an ongoing session control dialog or an ongoing session control transaction;
  comparing the fingerprint to a list of fingerprints associated with known malicious user agents when the received session control protocol request message is not associated with an ongoing session control dialog or an ongoing session control transaction; and rejecting the session control protocol request message when the fingerprint matches any fingerprint in the list of fingerprints associated with known malicious user agents.

2. The method of claim 1,
wherein the session control protocol request message includes a Session Initiation Protocol (SIP) request message having a header,
wherein fingerprinting the session control protocol request message includes fingerprinting the header of the SIP request message; and
wherein determining whether the session control protocol request message is associated with an ongoing session control dialog or an ongoing session control transaction includes determining a dialog identifier (ID) or a transaction ID associated with the SIP request message.

3. The method of claim 2, wherein fingerprinting the header includes fingerprinting the header based on a number of header elements, a content of header elements, or an ordering of header elements.

4. The method of claim 2,
wherein fingerprinting the header includes generating a first fingerprint by fingerprinting a Call-ID field in the header, and
wherein comparing includes comparing the first fingerprint to the list of fingerprints when the received session control protocol request message is not associated with an ongoing session control dialog or an ongoing session control transaction, and
wherein the method further comprises:
  generating a second fingerprint, in response to the first fingerprint not matching any fingerprint in the list of fingerprints, by fingerprinting the header of the SIP request message based on a number of header elements, a content of header elements, or an ordering of header elements;
  comparing, in response to the first fingerprint not matching any fingerprint in the list of fingerprints, the second fingerprint to the list of fingerprints when the received session control protocol request message is not associated with an ongoing session control dialog or an ongoing session control transaction; and
  rejecting the session control protocol request message when the second fingerprint matches any fingerprint in the list of fingerprints.

5. The method of claim 2, further comprising:
comparing the fingerprint to a list of fingerprints associated with known non-malicious user agents; and
accepting the session control protocol request message when the fingerprint matches any fingerprint in the list of fingerprints associated with known non-malicious user agents.

6. The method of claim 5, further comprising:
determining whether the received session control protocol request message is associated with an anomalous event when the fingerprint does not match any fingerprint in the list of fingerprints associated with known malicious user agents and when the fingerprint does not match any fingerprints in the list of fingerprints associated with known non-malicious user agents; and
adding the fingerprint to the list of fingerprints associated with known malicious user agents when determined that the received session control protocol request message is associated with an anomalous event.

7. The method of claim 5, further comprising:
determining whether the received session control protocol request message is associated with an anomalous event when the fingerprint does not match any fingerprint in the list of fingerprints associated with known malicious user agents and when the fingerprint does not match any fingerprint in the list of fingerprints associated with known non-malicious user agents; and
adding the fingerprint to the list of fingerprints associated with known non-malicious user agents when determined that the received session control protocol request message is not associated with an anomalous event.

8. A method comprising:
receiving a session control protocol request message;
determining whether the session control protocol request message is associated with an ongoing session control dialog or an ongoing session control transaction;
fingerprinting the session control protocol message, to generate a fingerprint, in response to a determination that the session control protocol message is not associated with an ongoing session control dialog or an ongoing session control transaction;
comparing the fingerprint to a list of fingerprints associated with known malicious user agents when the session control protocol request message is not associated with an ongoing session control dialog or an ongoing session control transaction;
holding the session control protocol request message when the fingerprint does not match any fingerprint in the list of fingerprints associated with known malicious user agents;
determining whether the received session control protocol request message is associated with an anomalous event when the fingerprint does not match any fingerprint in the list of fingerprints associated with known malicious user agents; and
blocking the received session control protocol request message when the received session control protocol request message is associated with the anomalous event.

9. The method of claim 8, wherein the session control protocol request message is a particular request message, and wherein determining whether the particular request message is associated with the anomalous event includes:
receiving a number of additional session control protocol messages;
fingerprinting each of the additional session control protocol messages to generate a fingerprint for each of the additional session control protocol messages, wherein the fingerprint of each of the additional session control protocol messages matches the particular request message; and
determining that the particular request message is associated with the anomalous event when the number of additional session control protocol messages exceeds a threshold.

10. The method of claim 8, further comprising:
adding the fingerprint to the list of fingerprints associated with known malicious user agents when determined that the received session control protocol request message is associated with an anomalous event.

11. The method of claim 8,
wherein the session control protocol request message includes a Session Initiation Protocol (SIP) request message having a header, and
wherein fingerprinting the session control protocol message includes fingerprinting the header of the SIP request message.

12. The method of claim 11, wherein fingerprinting the header includes fingerprinting the header based on a number of header elements, a content of header elements, or an ordering of header elements.

13. The method of claim 12, wherein fingerprinting the header includes fingerprinting a Call-ID field in the header.

14. The method of claim 12, further comprising:
comparing the fingerprint to a list of fingerprints associated with known non-malicious user agents; and
accepting the session control protocol request message when the fingerprint matches any fingerprint in the list of fingerprints associated with known non-malicious user agents.

15. The method of claim 12, further comprising:
determining whether the received session control protocol request message is associated with an anomalous event when the fingerprint does not match any fingerprint in the list of fingerprints associated with known malicious user agents and when the fingerprint does not match any fingerprint in the list of fingerprints associated with known non-malicious user agents; and
adding the fingerprint to the list of fingerprints associated with known non-malicious user agents when the received session control protocol request message is not associated with an anomalous event.

16. A network device comprising:
a receiver to receive a session control protocol request message;
a memory to store a list of fingerprints associated with known malicious user agents; and
a processor to:
determine whether the session control protocol request message is associated with an ongoing session control dialog or an ongoing session control transaction,
fingerprint the session control protocol message in response to a determination or an ongoing session control transaction,
compare the fingerprint to a list of fingerprints associated with known malicious user agents when the session control protocol request message is not associated with an ongoing session control dialog or an ongoing session control transaction, and
determine to reject the request message when the fingerprint matches any fingerprint in the list of fingerprints associated with known malicious user agents.

17. The network device of claim 16,
wherein the session control protocol request message includes a Session Initiation Protocol (SIP) request message having a header, and
wherein the processor is configured to fingerprint the session control protocol message by fingerprinting the header of the SIP request message.

18. The network device of claim 17, wherein the processor is configured to fingerprint the header based on a number of header elements, a content of header elements, or an ordering of header elements.

19. The network device of claim 17, wherein the processor is configured to fingerprint a Call-ID field in the header.

20. The network device of claim 17, wherein the processor is configured to:
compare the fingerprint to a list of fingerprints associated with known non-malicious user agents; and
determine to accept the session control protocol request message when the fingerprint matches any fingerprint in the list of fingerprints associated with known non-malicious user agents.

21. The network device of claim 20, wherein the processor is further configured to:
determine whether the received session control protocol request message is associated with an anomalous event when the fingerprint does not match any fingerprint in the list of fingerprints associated with known malicious user agents and when the fingerprint does not match any fingerprints in the list of fingerprints associated with known non-malicious user agents; and
add the fingerprint to the list of fingerprints associated with known malicious user agents when the received session control protocol request message is associated with an anomalous event.

22. The network device of claim 20, further comprising:
determining whether the received session control protocol request message is associated with an anomalous event when the fingerprint does not match any fingerprint in the list of fingerprints associated with known malicious user agents and when the fingerprint does not match any fingerprint in the list of fingerprints associated with known non-malicious user agents; and
adding the fingerprint to the list of fingerprints associated with known non-malicious user agents when the received session control protocol request message is not associated with an anomalous event.

23. The method of claim 1, further comprising:
receiving an additional session control protocol request message;
determining whether the additional session control protocol request message is associated with an ongoing session control dialog or an ongoing session control transaction; and
forwarding the additional session control protocol request message to a proxy network device, without comparing a fingerprint of the additional session control protocol request message to the list of fingerprints, in response to a determination that the additional session control protocol request message is associated with an ongoing session control dialog or an ongoing session control transaction.

* * * * *